US012699929B2

(12) United States Patent
Okawa et al.

(10) Patent No.: US 12,699,929 B2
(45) Date of Patent: Aug. 4, 2026

(54) COMPUTER-READABLE RECORDING MEDIUM STORING MULTI-AGENT REINFORCEMENT LEARNING PROGRAM, INFORMATION PROCESSING APPARATUS, AND MULTI-AGENT REINFORCEMENT LEARNING METHOD

(71) Applicant: Fujitsu Limited, Kawasaki (JP)

(72) Inventors: Yoshihiro Okawa, Yokohama (JP); Hayato Dan, Yokohama (JP); Natsuki Ishikawa, Yamato (JP); Masatoshi Ogawa, Zama (JP)

(73) Assignee: Fujitsu Limited, Kawasaki (JP)

( * ) Notice: Subject to any disclaimer, the term of this patent is extended or adjusted under 35 U.S.C. 154(b) by 613 days.

(21) Appl. No.: 18/214,528

(22) Filed: Jun. 27, 2023

(65) Prior Publication Data

US 2024/0119351 A1 Apr. 11, 2024

(30) Foreign Application Priority Data

Sep. 20, 2022 (JP) ................................. 2022-149479

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

| | | | | |
|---|---|---|---|---|
| 2018/0165602 | A1* | 6/2018 | Van Seijen | G06N 3/08 |
| 2021/0200163 | A1 | 7/2021 | Nagarathinam et al. | |
| 2022/0261647 | A1* | 8/2022 | Mnih | G06N 3/092 |

FOREIGN PATENT DOCUMENTS

| | | |
|---|---|---|
| JP | 2009-014300 A | 1/2009 |
| JP | 2020-080103 A | 5/2020 |

OTHER PUBLICATIONS

N. Yang, B. Ding, P. Shi and D. Feng, "Improving scalability of multi-agent reinforcement learning with parameters sharing," 2022 IEEE International Conference on Joint Cloud Computing (JCC), Fremont, CA, USA, 2022, pp. 37-42, doi: 10.1109/JCC56315.2022.00013 (Year: 2022).*

Gu et al., "Multi-Agent Constrained Policy Optimisation", arXiv:2110.02793v2 [cs.AI], Feb. 10, 2022, 22 pages.

* cited by examiner

*Primary Examiner* — Mehmet Yesildag

(74) *Attorney, Agent, or Firm* — XSENSUS LLP

(57) ABSTRACT

A process includes obtaining, according to a predetermined update order of a policy parameter of each agent, a degree of influence on a constraint specific to a first agent and a degree of influence on a system-wide constraint in which a degree of influence by an updated policy parameter of a second agent previous to the first agent in the update order is shared, and in a case where an update width of the policy parameter of the first agent exists in both ranges respectively determined depending on the degree of influence on the constraint specific to the first agent and the degree of influence on the system-wide constraint, updating the policy parameter of the first agent and causing the degree of influence on the system-wide constraints by the updated policy parameter to be shared with a third agent next to the first agent in the update order.

3 Claims, 11 Drawing Sheets

DISCOUNT COST FOR SYSTEM-WIDE CONSTRAINT

Legend:
- MATRPO(w/o constraint)
- Proposed(w/constraint)
- Threshold(=10)

CONSTRAINT IS SATISFIED IN (ALMOST ALL) EPISODES IN MIDDLE OF LEARNING (x-axis: EPISODE; y-axis: DISCOUNT COST)

COMPUTER — 200

211

MEMORY — 201

CPU — 203

HDD — 205

MULTI-AGENT REINFORCEMENT LEARNING PROGRAM — 205a

MULTI-AGENT REINFORCEMENT LEARNING PROCESSING-RELATED INFORMATION — 205b

DRIVE DEVICE — 213

INPUT DEVICE — 215

DISPLAY CONTROL UNIT — 207

DISPLAY DEVICE — 209

COMMUNICATION I/F — 217

219

TO NETWORK

COMPUTER-READABLE RECORDING MEDIUM STORING MULTI-AGENT REINFORCEMENT LEARNING PROGRAM, INFORMATION PROCESSING APPARATUS, AND MULTI-AGENT REINFORCEMENT LEARNING METHOD

CROSS-REFERENCE TO RELATED APPLICATION

This application is based upon and claims the benefit of priority of the prior Japanese Patent Application No. 2022-149479, filed on Sep. 20, 2022, the entire contents of which are incorporated herein by reference.

FIELD

The embodiments discussed herein are related to a computer-readable recording medium storing multi-agent reinforcement learning program, and the like.

BACKGROUND

In recent years, multi-agent reinforcement learning (MARL) has been known in which multiple agents solve a shared problem while interacting with a common environment and sequentially making decisions. Such multi-agent reinforcement learning has a first problem that the number of dimensions of an action space to be learned exponentially increases as the number of agents increases and a second problem that the performance during and after learning is not guaranteed, which is a problem that there is no way of knowing the final performance until the learning ends, for example.

There has been disclosed a method for constrained multi-agent reinforcement learning involving multiple agents, in which each of the agents learns its own policy that maximizes a reward common to all the agents while satisfying safety constraints specific to the agent. Causing each agent to learn its own policy, this method makes it possible to avoid an exponential increase in the dimensions of the action space to be learned. For example, this method makes it possible to avoid the first problem that the number of the dimensions of the action space to be learned exponentially increases as the number of agents increases.

Japanese Laid-open Patent Publication Nos. 2009-014300 and 2020-080103 and U.S. Patent No. 2021/0200163 are disclosed as related art.

In addition, Gu, Shangding, et al., "Multi-agent constrained policy optimisation." arXiv preprint arXiv: 2110.02793 (2021) is also disclosed as the related art.

SUMMARY

According to an aspect of the embodiments, a non-transitory computer-readable recording medium storing a multi-agent reinforcement learning program for causing a computer to execute a process for a constrained control problem in which a plurality of agents are involved, the process includes obtaining, according to a predetermined update order of a policy parameter of each agent of the plurality of agents, a degree of influence on a constraint specific to a first agent of the plurality of agents and a degree of influence on a system-wide constraint in which a degree of influence by an updated policy parameter of a second agent previous to the first agent in the update order is shared, the second agent being included in the plurality of agents, and in a case where an update width of the policy parameter of the first agent exists in both ranges respectively determined depending on the degree of influence on the constraint specific to the first agent and the degree of influence on the system-wide constraint, updating the policy parameter of the first agent and causing the degree of influence on the system-wide constraints by the updated policy parameter to be shared with a third agent next to the first agent in the update order, the third agent being included in the plurality of agents.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The methods in the related art have a problem that it is not possible to perform learning in consideration of system-wide constraints that depend on results of actions of multiple agents. This seems to result in the second problem that the performance during and after learning is not guaranteed.

Hereinafter, embodiments of techniques capable to perform learning in consideration of system-wide constraints in constrained multi-agent reinforcement learning will be described in detail with reference to the drawings. The present disclosure is not limited to the embodiments.

First, a method for constrained multi-agent reinforcement learning involving multiple agents will be described. The multi-agent reinforcement learning mentioned herein is learning in which multiple agents solve a shared problem while interacting with a common environment and sequentially making decisions. For example, in the constrained multi-agent reinforcement learning, each agent learns a policy for minimizing (or maximizing) a "reward" (objective function) while observing current "states" and satisfying "constraints" by using a series of "actions" as keys. The "constraints" mentioned herein refer to conditions for guaranteeing performance. An example of constrained multi-agent reinforcement learning is learning of an algorithm for wave transmission stop control of each base station (BS) in a communication network in each area so as to minimize a total sum of power to be consumed by all BSs while keeping a certain or higher average satisfaction level of all users attached to the BS. The BS mentioned herein is an example of the agent. Keeping a certain or higher average satisfaction level of all the users is an example of the "constraints". A time point, an amount of grid demand, a load of a BS at a previous time point, power consumed by the BS at the previous time point, and so on are examples of the "states". The total sum of power to be consumed by all the BSs is an example of the "reward" (objective function). Stopping or continuing wave transmission of each BS (turning the BS on/off) is an example of the "actions".

In a method of multi-agent reinforcement learning processing, each agent learns its own policy that maximizes a reward common to all the agents while satisfying safety constraints specific to the agent. In this method, each agent learns the policy and accordingly each agent recognizes its actions, which makes it possible to avoid an exponential increase in the dimensions of the action space.

Figure 6:
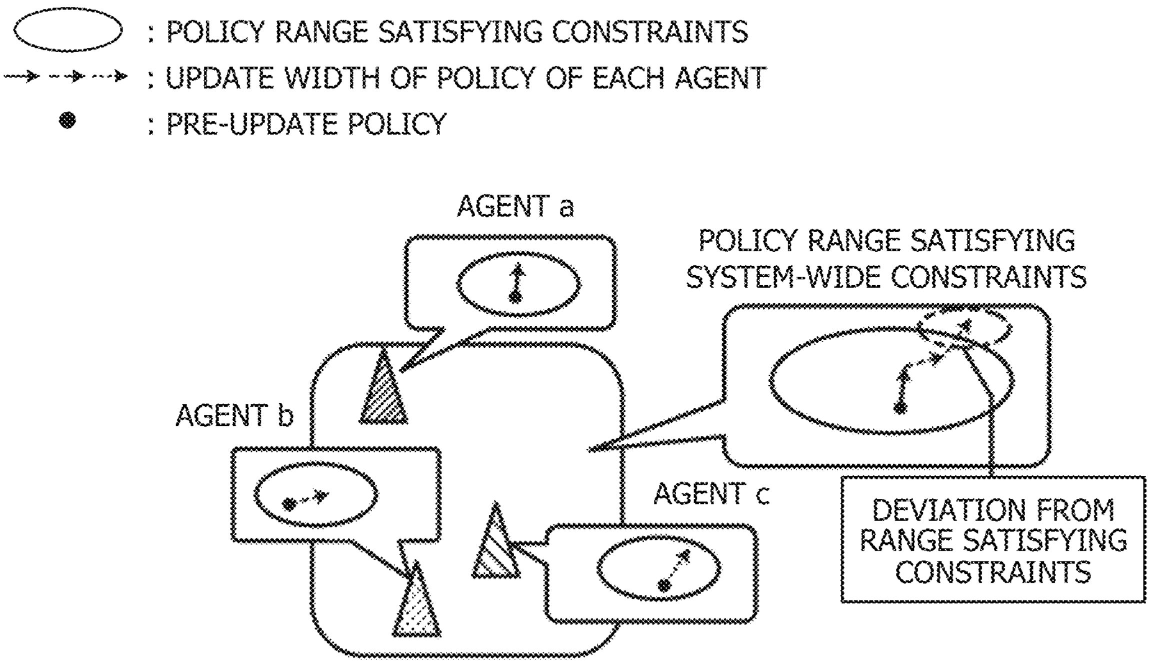
FIG. 6 is a diagram illustrating a reference example of multi-agent reinforcement learning processing.

However, this method has a problem that it is impossible to perform learning in consideration of system-wide constraints that depend on results of actions of multiple agents. This problem will be described. FIG. 6 is a diagram illustrating a reference example of multi-agent reinforcement learning processing. FIG. 6 illustrates a case where there are three agents.

As illustrated in FIG. 6, in the multi-agent reinforcement learning processing, each agent updates its own policy so as to satisfy its own specific constraint. In one learning step, an agent a calculates an update width of its policy based on the pre-update policy so as to satisfy its own specific constraint, and updates the policy by the calculated update width. In the same learning step, each of agents b and c similarly calculates an update width of its policy based on the pre-update policy so as to satisfy its own specific constraint, and updates the policy by the calculated update width.

However, with the method in which each agent updates its own policy so as to satisfy its own specific constraint, the system-wide constraints are not necessarily satisfied. For example, there is a case where the post-update policy of a certain agent may deviate from a policy range satisfying the system-wide constraints. For example, with this method, it is not possible to perform learning in consideration of the system-wide constraints that depend on results of actions of multiple agents.

To address this, there is a conceivable approach including: calculating degrees of influence on both of constraints specific to each agent and system-wide constraints after update of the policy of the agent; and imposing, on the update width of the policy in each learning step, a limitation according to the calculated degrees of influence.

However, in the case where the agents sequentially update their policies, even when a preceding agent in the update order updates the policy so as to satisfy the constraints, the constraints may not be satisfied due to update by a subsequent agent in the update order. For this reason, it is desirable to appropriately update the policy of each agent, but there is no specific and quantitative method for the update method.

To this end, the following embodiments will be described for constrained multi-agent reinforcement learning processing capable of learning for appropriately updating the policy of each agent in consideration of system-wide constraints.

EMBODIMENTS

Figure 1:
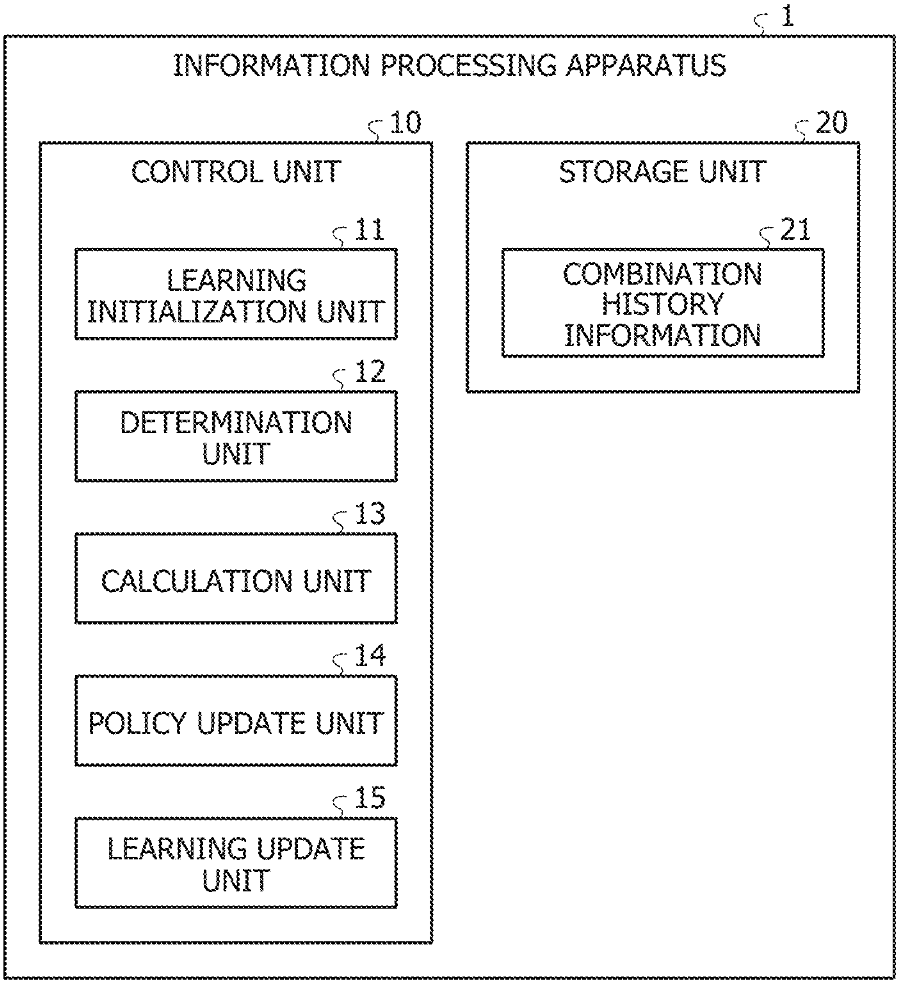
FIG. 1 is a block diagram illustrating an example of a functional configuration of an information processing apparatus according to an embodiment.

FIG. 1 is a block diagram illustrating an example of a functional configuration of an information processing apparatus according to an embodiment. An information processing apparatus 1 illustrated in FIG. 1 causes each of agents to in turn calculate degrees of influence on its own specific constraints and system-wide constraints, and update the policy within a range determined depending on the calculated degrees of influence only when the update width is within the range. In the case where the policy is updated, the information processing apparatus 1 causes the degree of influence on the system-wide constraints by the post-update policy to be shared with the next agent in the update order. The policy mentioned herein means a policy parameter. Hereinafter, the agent to be an object of the update policy is described as an own agent.

The information processing apparatus 1 includes a control unit 10 and a storage unit 20. The control unit 10 includes a learning initialization unit 11, a determination unit 12, a calculation unit 13, a policy update unit 14, and a learning update unit 15. The storage unit 20 has combination history information 21. The determination unit 12 and the calculation unit 13 are an example of a calculation unit. The policy update unit 14 is an example of an update unit.

The combination history information 21 is history information in which a combination of states, an action, and a reward in a learning episode is stored for each agent. The learning episode mentioned herein means a section from the start to the end of an action on an environment given to reinforcement learning. For example, the states, the action, and the reward for learning an algorithm for wave transmission stop control of each BS (agent) are as follows. The states are information indicating a time point, an amount of grid demand, a load of a BS at a previous time point, power consumed by the BS at the previous time point, and the like. The action is information indicating ON/OFF (stopping or continuing wave transmission) of the BS. The reward is information indicating a total sum of power to be consumed by all the BSs.

The learning initialization unit 11 initializes data to be used for learning. For example, the learning initialization unit 11 initializes learning parameters to be used in reinforcement learning. The learning initialization unit 11 initializes a learning episode to be used in the reinforcement learning. The learning initialization unit 11 acquires a combination history of the states, the action, and the reward for a certain time period in the current learning episode for each agent, and stores the combination history in the combination history information 21.

The determination unit 12 randomly determines a policy parameter update order of all the agents. In this way, the determination unit 12 allows all the agents to evenly update their own policy parameters.

According to the determined update order, the calculation unit 13 calculates the degree of influence on the constraints specific to the own agent and the degree of influence on the system-wide constraints updated with the policy update of the preceding agent in the update order. For example, the calculation unit 13 calculates the degree of influence on the constraints specific to the own agent according to the update order determined by the determination unit 12. The calculation unit 13 calculates the degree of influence on the system-wide constraints in which the degree of influence by the post-update policy parameter of the preceding agent in the update order is shared. The calculation unit 13 calculates each of the degrees of influence by using the combination history information 21.

The policy update unit 14 updates the policy parameter of the own agent when the update width of the policy parameter of the own agent is within a range determined depending on the degree of influence on the constraints specific to the own agent and the degree of influence on the system-wide constraints. The update width mentioned herein means a width of update from the pre-update policy parameter to the post-update policy parameter. For example, when a possible range of the post-update policy parameter of the own agent is within the range determined depending on the degree of influence on the constraints specific to the own agent and the degree of influence on the system-wide constraints, the policy update unit 14 updates the policy parameter of the own agent within the range. The possible range of the post-update policy parameter is calculated based on, for example, Formula (1).

(1)

$$\bar{\Pi}^{i_h} = \{\pi^{i_h} \in \Pi^{i_h} | D_{KL}^{max}(\pi_k^{i_h}, \pi^{i_h}) \leq \delta, \tag{1.1}$$

$$J_j^{i_h}(\pi_k) + L_{j,\pi_k}^{i_h}(\pi^{i_h}) + v_j^{i_h} D_{KL}^{max}(\pi_k^{i_h}, \pi^{i_h}) \leq c_j^{i_l} - \sum_{l=1}^{h-1} v_j^{i_l} D_{KL}^{max}(\pi_k^{i_l}, \pi^{i_l}), \tag{1.2}$$

$$\forall j = 1, \ldots, m^{i_h},$$

$$J_p(\pi_k) + \underbrace{L_{p,\pi_k}^{i_{1:h}}(\pi_{k+1}^{i_{1:h-1}}, \pi^{i_h})}_{a1} + v_p D_{KL}^{max}(\pi_k^{i_h}, \pi^{i_h}) \leq \tag{1.3}$$

$$d_p - \sum_{l=1}^{h-1} [\underbrace{(L_{p,\pi_k}^{i_{1:l}}(\pi_{k+1}^{i_{1:l-1}}, \pi^{i_l})}_{a2} + v_p D_{KL}^{max}(\pi_k^{i_l}, \pi^{i_l})], \forall_p = 1, \ldots, M\}$$

The left side of Formula (1) indicates a set of policy parameters $\pi^{ih}$ satisfying agent-specific constraints of an agent $i_h$ and system-wide constraints. For example, the left side of Formula (1) indicates the possible range of the post-update policy parameter. The right side of Formula (1) is composed of (1.1), (1.2), and (1.3).

(1.1) is a condition for keeping small a change from a policy parameter $\pi_k^{ih}$ in a previous learning step k in the own agent $i_h$. The variables in (1.1) are defined as follows. The variable $\pi^{ih}$ indicates a post-update policy parameter of the agent $i_h$. The variable $\pi_k i_h$ indicates a pre-update policy parameter of the agent $i_h$ (in the learning step k). The variable $D_{kL}^{max}$ indicates a maximum value of Kullback-Leibler divergence between the two policy parameters. The variable δ indicates an upper limit of the change between the pre-update and post-update policy parameters.

(1.2) is a condition for satisfying each constraint j specific to each agent $i_h$. The variables of (1.2) are defined as follows. The variable $J_j^{ih}(\cdot)$ and the variable $c_j^{ih}$ indicate a cost function and its upper limit value for the constraint j specific to the agent $i_h$. The variable $L^{ih}_{j,nk}(\pi^{ih})$ indicates a degree of influence on the specific constraint j by the post-update policy parameter of the agent $i_h$. The variable $v_j^{ih}$ indicates a coefficient related to a change in the constraint j specific to the agent $i_h$ before and after the update of the policy parameter. The variable $m^{ih}$ indicates the number of constraints specific to the agent $i_h$.

(1.3) is a condition for satisfying each system-wide constraint p, and includes a degree of influence shared from the preceding agent in the update order. The variables of (1.3) are defined as follows. The variable $J_p(\cdot)$ and the variable $d_p$ indicate a cost function and its upper limit value for the system-wide constraint p. The variable $\pi_{k+1}^{i1:h-1}$ indicates post-update policy parameters of agents $(i_1, \ldots, i_{h-1})$ preceding to the agent $i_h$ in the update order. The variable L marked with a reference sign a1 indicates a degree of influence on the system-wide constraint p by the post-update policy parameters of the agent $i_h$ and the agents $(i_1, \ldots, i_{h-1})$ preceding to the agent $i_h$ in the update order. The variable L, I=1, . . . , h−1 marked with a reference sign a2 indicates a degree of influence on the system-wide constraint p by the post-update policy parameters of the agent preceding to the agent $i_h$ in the update order, the degree shared from the agent preceding to the agent $i_h$ in the update order. The variable $V_p$ indicates a coefficient for a change in the system-wide constraint p before and after the update of the policy parameter. The variable M indicates the number of system-wide constraints.

For example, the policy update unit 14 determines whether or not the update width of the policy parameter of the own agent is within the range determined depending on the degree of influence on the constraints specific to the own agent by using (1.1) and (1.2) in Formula (1). The policy update unit 14 determines whether or not the update width of the policy parameter of the own agent is within the range determined depending on the degree of influence on the system-wide constraints by using Formula (1.3). For example, the policy update unit 14 determines whether or not the update width of the policy parameter of the own agent is within the range determined depending on the degree of influence on the constraints specific to the own agent and the degree of influence on the system-wide constraints by using Formula (1) composed of (1.1) to (1.3).

When determining that the update width of the policy parameter of the own agent exists in the range determined depending on the degree of influence on the constraints specific to the own agent and the range determined depending on the degree of influence on the system-wide constraints, the policy update unit 14 performs the following processing. For example, the policy update unit 14 updates the policy parameter of the own agent by the existing update width. Accordingly, the policy update unit 14 is able to perform learning in consideration of the system-wide constraints that depend on results of actions of multiple agents. By learning the policy of the own agent in turn, the policy update unit 14 grasps the actions of only the own agent, and thus makes it possible to avoid an exponential increase in the dimensions of the action space. The policy update unit 14 causes the degree of influence after the update to be shared with the next agent in the update order.

When determining that the update width of the policy parameter of the own agent is not within the range determined depending on the degree of influence on the constraints specific to the own agent and the range determined depending on the degree of influence on the system-wide constraints, the policy update unit 14 performs the following processing. For example, the policy update unit 14 aborts update of the policy parameters of the own agent and the subsequent agents in the update order. This is because of the absence of an update width by which the policy parameter is updatable. For example, the range of the policy parameter that satisfies the constraints specific to the agent and the range of the policy parameter that satisfies the system-wide constraints do not have any common portion sufficient for the update width. Accordingly, the policy update unit 14 is able to guarantee that the constraints specific to each agent and also the system-wide constraints that depend on the action results of the multiple agents will be satisfied during and after the learning.

The learning update unit 15 updates data to be used for learning. For example, the learning update unit 15 updates learning parameters to be used in the reinforcement learning. The learning parameters mentioned herein mean learning parameters other than the policy parameter. The learning update unit 15 increments a count for learning episodes to be used in the reinforcement learning. If the learning episode count is smaller than a maximum learning episode count, the learning update unit 15 performs learning in the next learning episode.

[Images of Multi-Agent Reinforcement Learning Processing]

Figure 2A:
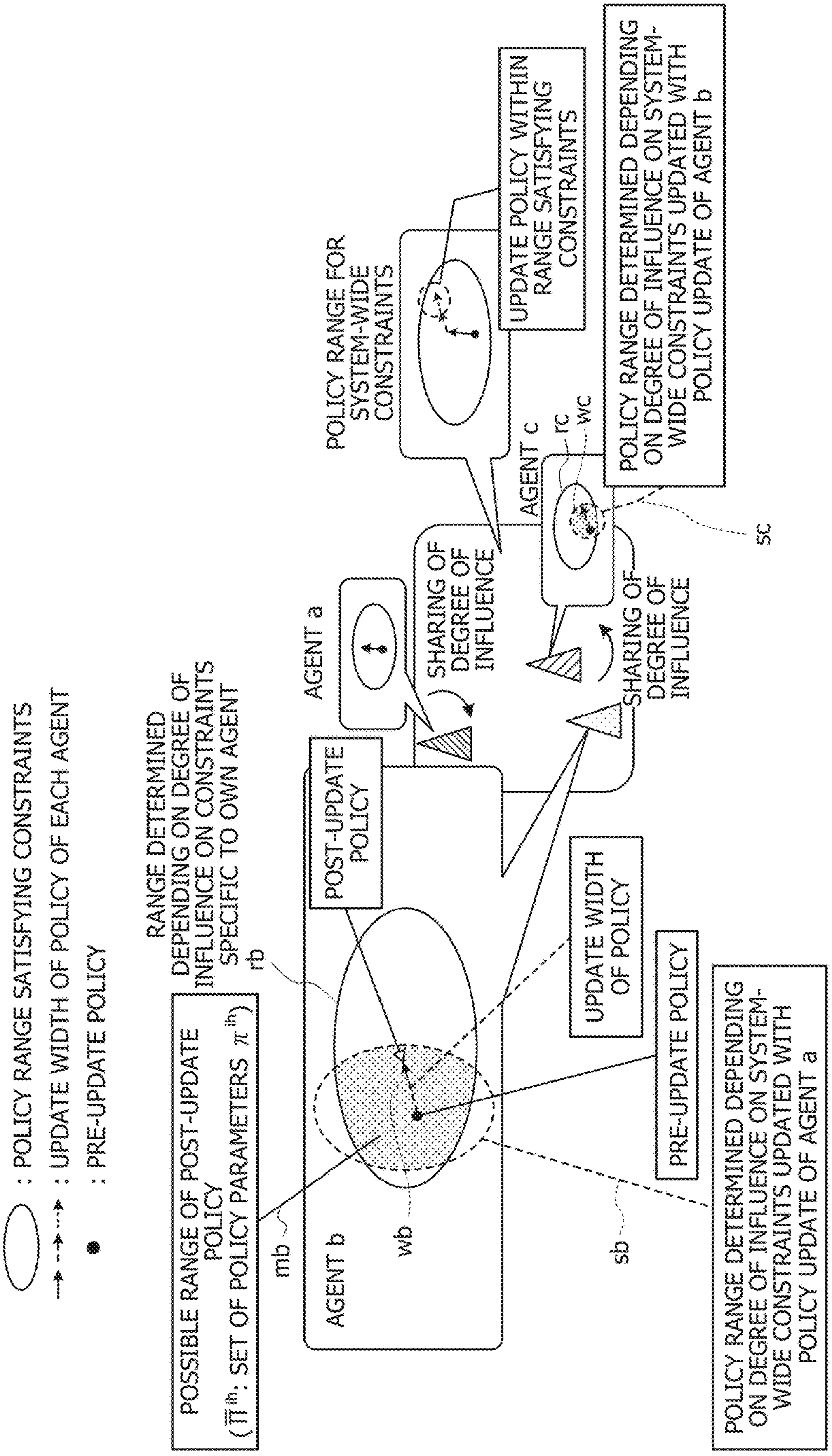
FIG. 2A is a diagram (1) illustrating an image of multi-agent reinforcement learning processing according to the embodiment.
Figure 2B:
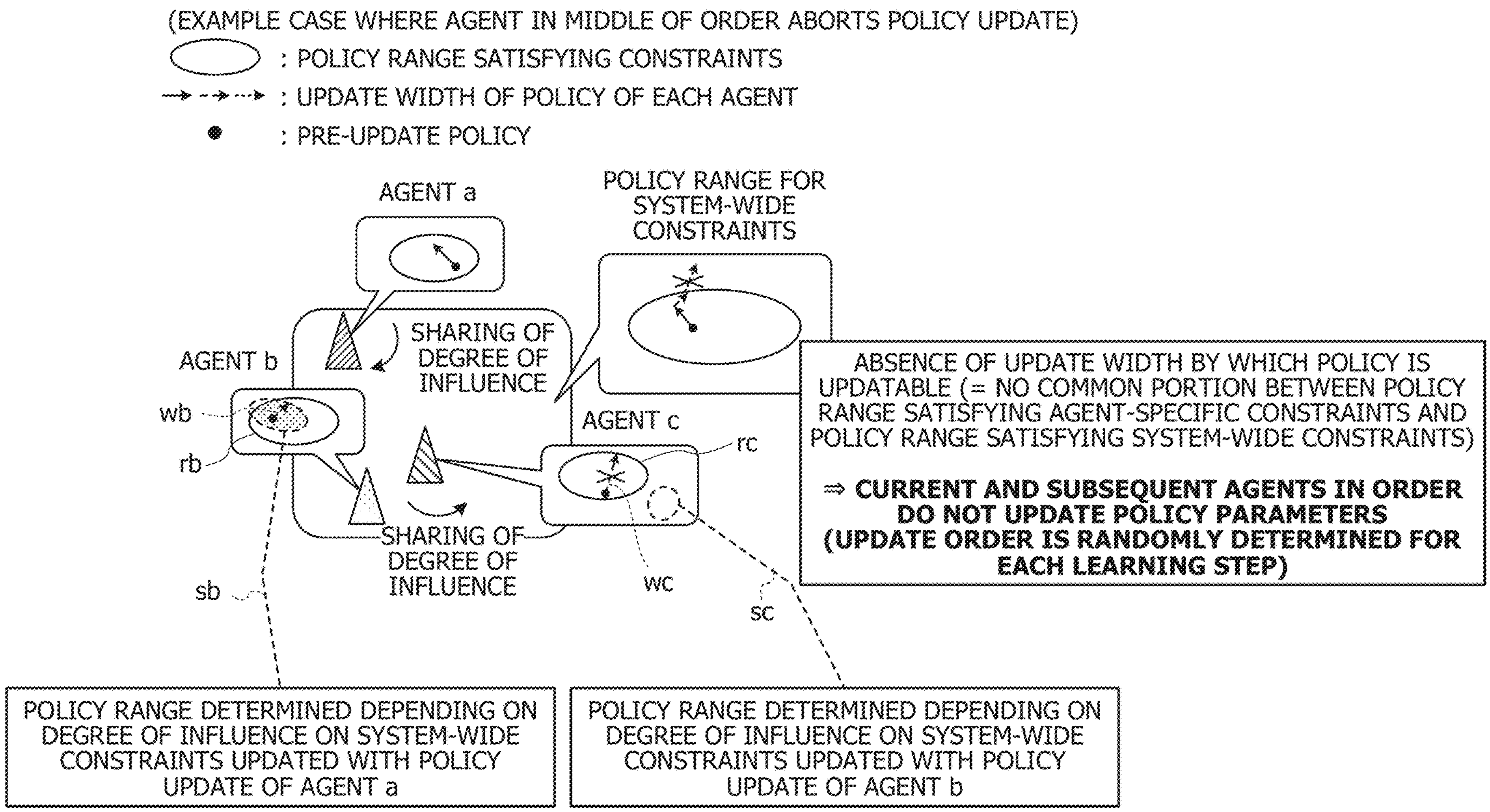
FIG. 2B is a diagram (2) illustrating an image of the multi-agent reinforcement learning processing according to the embodiment.

Images of multi-agent reinforcement learning processing according to the embodiment will be described with reference to FIGS. 2A and 2B. FIGS. 2A and 2B are diagrams illustrating the images of the multi-agent reinforcement learning processing according to the embodiment. There are three agents a, b, and c. The determination unit 12 randomly determines a, b, and c as a policy parameter update order of all the agents. The policy update unit 14 causes the degree of influence by the post-update policy parameter of the agent a to be shared with the next agent b in the update order.

The calculation unit 13 calculates the degree of influence on the constraints specific to the next agent b in the update order, and the degree of influence on the system-wide constraints in which the degree of influence by the post-update policy parameter of the preceding agent a in the update order is shared. For example, the calculation unit 13 calculates the degree of influence on the constraints specific to the agent b, and calculates the degree of influence on the system-wide constraints by sharing the degree of influence of the post-update policy parameter of the agent a. The policy update unit 14 determines whether or not the update width of the policy parameter of the own agent b is within a range determined depending on the degree of influence on the constraints specific to the own agent b and the degree of influence on the system-wide constraints. For example, the policy update unit 14 determines whether or not the possible range of the post-update policy parameter of the own agent b is within the range determined depending on the degree of influence on the constraints specific to the own agent b and the degree of influence on the system-wide constraints.

As illustrated in FIG. 2A, the range determined depending on the degree of influence on the constraints specific to the agent b is a range marked with a reference sign rb. This range is expressed by both the left and right sides of (1.1) and (1.2) in Formula (1). The range determined depending on the degree of influence on the system-wide constraints, in which the degree of influence by the post-update policy parameter of the agent a is shared, is a range marked with a reference sign sb. This range is expressed by both the left and right sides of (1.3) in Formula (1). The possible range of the post-update policy parameter of the own agent b is a range marked with a reference sign mb. This range is expressed by both the left and right sides of Formula (1), and corresponds to a set of post-update policy parameters $\pi^{i_h}$ that may be taken by the agent b. For example, the range marked with the reference sign mb is an overlap portion between the range marked with the reference sign rb and the range marked with the reference sign sb. If there is at least one post-update policy parameter in the range marked with the reference sign mb, the possible range of the post-update policy parameter of the agent b exists, and the update width of the policy parameter exists. When the post-update policy parameter is represented by a certain point in the range marked with the reference sign mb, the update width mentioned herein refers to a line segment joining the pre-update policy parameter and the certain point.

In FIG. 2A, since the update width of the policy parameter of the own agent b exists in the range (mb) determined depending on the degree of influence on the constraints specific to the own agent b and the degree of influence on the system-wide constraints, the policy update unit 14 performs the following processing. For example, the policy update unit 14 updates the policy parameter of the own agent by the existing update width. The policy update unit 14 causes the degree of influence by the post-update policy parameter to be shared with the next agent in the update order.

The calculation unit 13 calculates the degree of influence on the constraints specific to the next agent c in the update order and the degree of influence on the system-wide constraints in which the degree of influence by the post-update policy parameter of the preceding agent b in the update order is shared. For example, the calculation unit 13 calculates the degree of influence on the constraints specific to the agent c, and calculates the degree of influence on the system-wide constraints by sharing the degree of influence by the post-update policy parameter of the agent b. The policy update unit 14 determines whether or not the update width of the policy parameter of the own agent c exists in a range determined depending on the degree of influence on the constraints specific to the own agent c and the degree of influence on the system-wide constraints. For example, the policy update unit 14 determines whether or not a possible range of the post-update policy parameter of the own agent c exists in the range determined depending on the degree of influence on the constraints specific to the own agent c and the degree of influence on the system-wide constraints.

As illustrated in FIG. 2A, the range determined depending on the degree of influence on the constraints specific to the agent c is a range marked with a reference sign rc. The range determined depending on the degree of influence on the system-wide constraints, in which the degree of influence by the post-update policy parameter of the agent b is shared, is a range marked with a reference sign sc. The possible range of the post-update policy parameter of the own agent c is an overlap portion between the range marked with the reference sign rc and the range marked with the reference sign sc. If there is at least one post-update policy parameter in the above range, the possible range of the post-update policy parameter of the agent c exists, and the update width of the policy parameter exists.

In FIG. 2A, since the update width of the policy parameter of the own agent c exists in the range determined depending on the degree of influence on the constraints specific to the own agent c and the degree of influence on the system-wide constraints, the policy update unit 14 performs the following processing. For example, the policy update unit 14 updates the policy parameter of the own agent by the existing update width.

Accordingly, the policy update unit 14 is able to update the policy parameter of each agent within a range satisfying the system-wide constraints. As a result, the policy update unit 14 is able to perform learning in consideration of the system-wide constraints that depend on results of actions of multiple agents.

FIG. 2B illustrates an example in which an agent in the middle of the order aborts the update of the policy parameter. As illustrated in FIG. 2B, the policy update unit 14 determines that an update width wb of the policy parameter of the agent b exists in a range (rb) determined depending on the degree of influence on the constraints specific to the agent b, and the update width wb of the policy parameter of the agent b exists in a range (sb) determined depending on the degree of influence on the system-wide constraints. For example, the policy update unit 14 determines that the update width wb of the policy parameter of the agent b exists in the policy range (sb) determined depending on the degree of influence on the system-wide constraints updated with the policy update of the preceding agent a in the update order. For this reason, the policy update unit 14 updates the policy parameter of the agent b, and causes the degree of influence by the post-update policy parameter to be shared with the next agent c in the update order.

Next, the calculation unit 13 calculates the degree of influence on the constraints specific to the agent c, and calculates the degree of influence on the system-wide constraints by sharing the degree of influence by the post-update policy parameter of the agent b. The policy update unit 14 determines whether or not the update width of the policy parameter of the own agent c exists in a range determined depending on the degree of influence on the constraints specific to the own agent c and the degree of influence on the system-wide constraints. For example, the policy update unit 14 determines whether or not a possible range of the post-update policy parameter of the own agent c exists in the range determined depending on the degree of influence on the constraints specific to the own agent c and the degree of influence on the system-wide constraints. The update width wc of the policy parameter of the agent c exists in a range (rc) determined depending on the degree of influence on the constraints specific to the agent c. However, the update width wc of the policy parameter of the agent c does not exist in a range (sc) determined depending on the degree of influence on the system-wide constraints. The ranges (rc, sc) do not have any common portion sufficient for the update width. For this reason, the policy update unit 14 aborts the update of the policy parameter of the agent c. The policy update unit 14 also aborts the update of the policy parameters of the subsequent agents in the update order.

This is because of the absence of an update width by which the policy parameter is updatable. For example, this is because an overlap portion between the range of the policy parameter satisfying the agent-specific constraints and the range of the policy parameter satisfying the system-wide constraints does not have a common portion sufficient for the update width. By aborting the update of the policy parameters of the agent c and the subsequent agents as described above, the policy update unit 14 is able to guarantee that the constraints specific to each agent and also the system-wide constraints that depend on results of actions of the multiple agents will be satisfied during and after the learning.

[Flowchart of Multi-Agent Reinforcement Learning Processing]

Figure 3A:
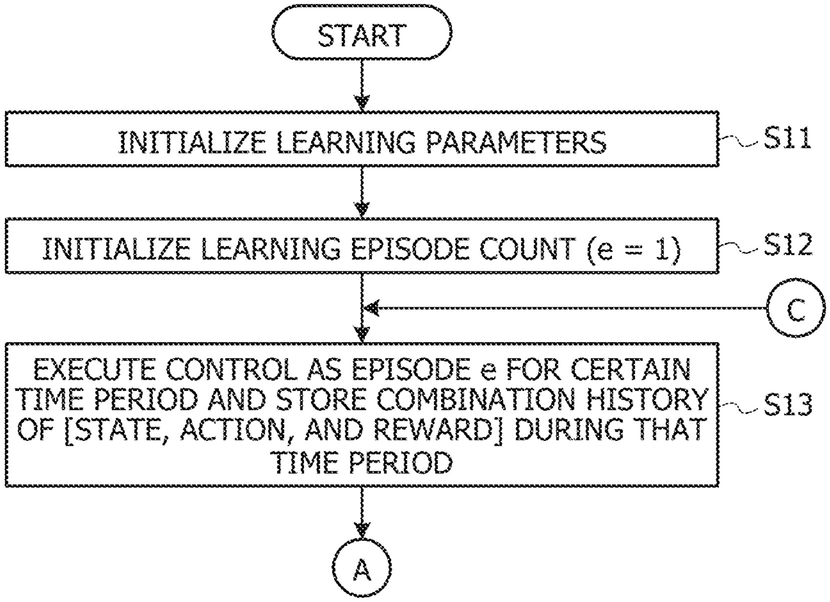
FIG. 3A is a diagram (1) presenting an example of an overall flowchart of the multi-agent reinforcement learning processing according to the embodiment.
Figure 3B:
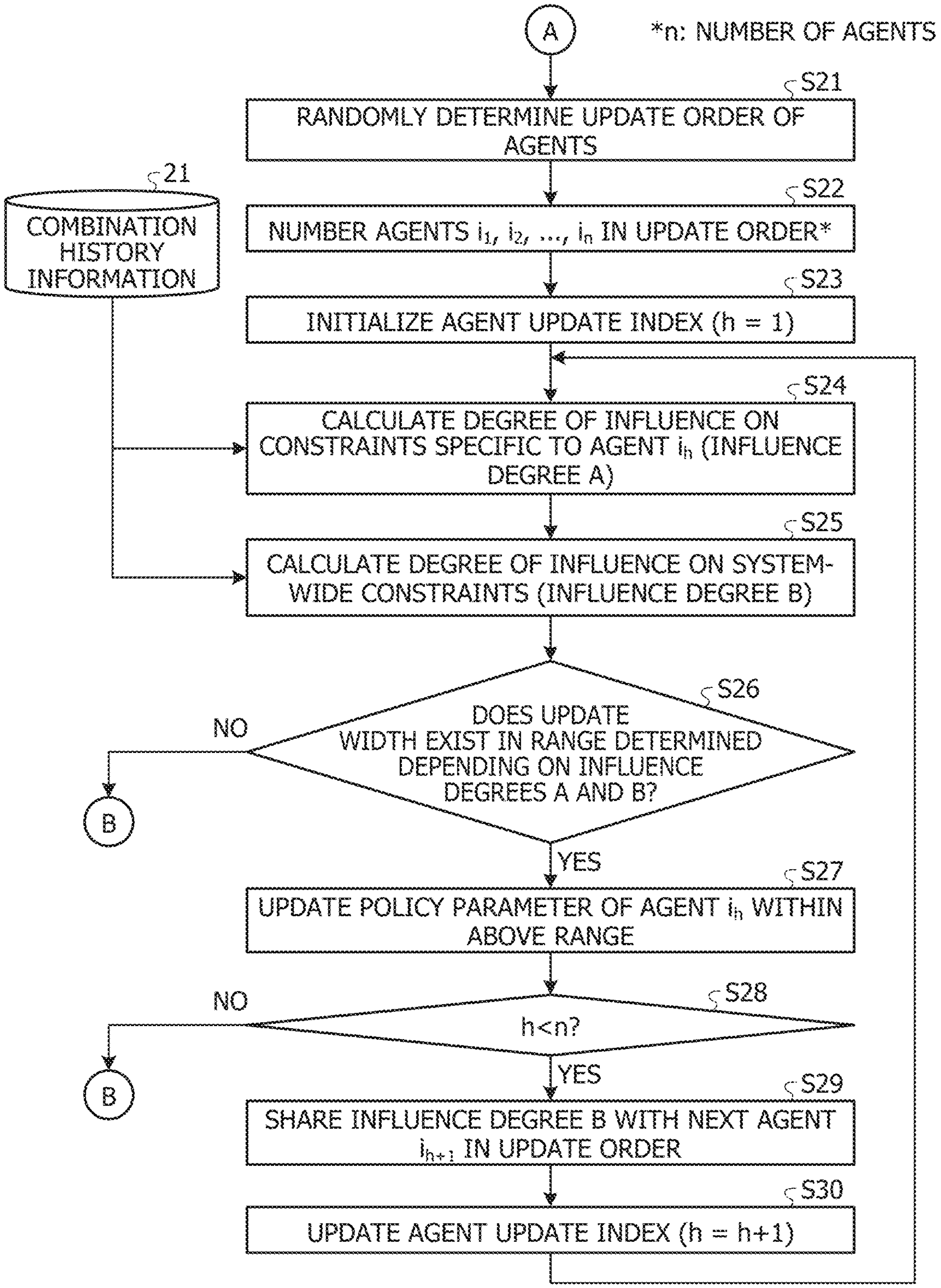
FIG. 3B is a diagram (2) presenting the example of the overall flowchart of the multi-agent reinforcement learning processing according to the embodiment.
Figure 3C:
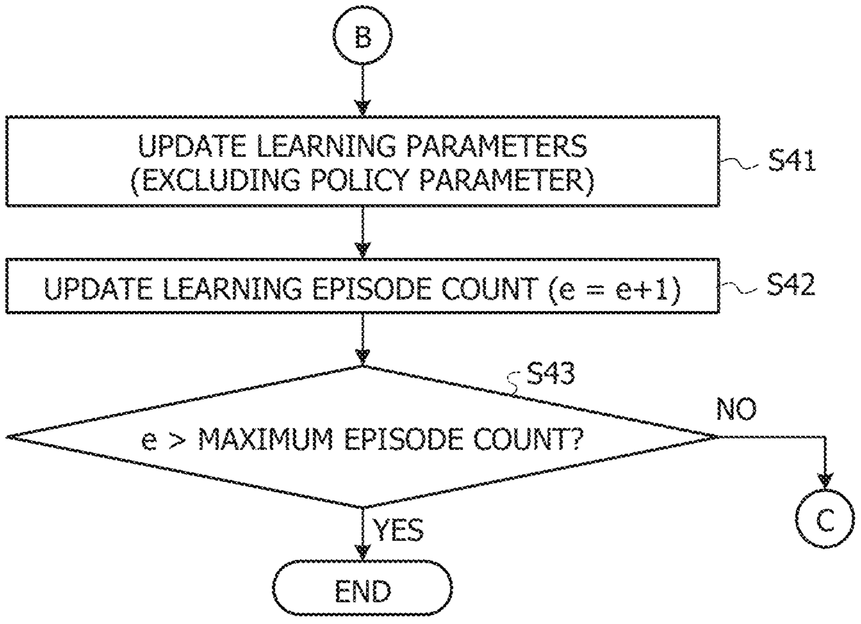
FIG. 3C is a diagram (3) presenting the example of the overall flowchart of the multi-agent reinforcement learning processing according to the embodiment.

Next, description will be given of an example of an overall flowchart of the multi-agent reinforcement learning processing performed by the information processing apparatus 1. FIGS. 3A to 3C are diagrams illustrating an example of an overall flowchart of the multi-agent reinforcement learning processing according to the embodiment.

As illustrated in FIG. 3A, the information processing apparatus 1 initializes the learning parameters (operation S11). The information processing apparatus 1 initializes a learning episode count (operation S12). The information processing apparatus 1 sets the learning episode count "1" in a variable e. As an episode e, the information processing apparatus 1 executes control for a certain time period, and saves a combination history of states, an action, and a reward for each agent during that time period in the combination history information 21 (operation S13).

As illustrated in FIG. 3B, the information processing apparatus 1 randomly determines an update order of agents (operation S21). For example, the information processing apparatus 1 numbers the agents $i_1, i_2, \ldots, i_n$ in the update order (operation S22). n is the number of the agents. The information processing apparatus 1 initializes an agent update index h (operation S23). The information processing apparatus 1 sets "1" in the variable h.

By using the combination history information 21, the information processing apparatus 1 calculates a degree of influence on constraints specific to an agent $i_h$ (influence degree A) (operation S24). By using the combination history information 21, the information processing apparatus 1 calculates a degree of influence on system-wide constraints (influence degree B) (operation S25). For example, the information processing apparatus 1 calculates the influence degree B on the system-wide constraints based on the degree of influence shared from the preceding agent in the update order.

The information processing apparatus 1 determines whether or not the update width of the policy parameter of the agent $i_h$ exists in a range determined depending on the influence degree A and the influence degree B (operation S26). When determining that the update width of the policy parameter of the agent $i_h$ does not exist in the range determined depending on the influence degree A and the influence degree B (operation S26; No), the information processing apparatus 1 performs the following processing. For example, the information processing apparatus 1 proceeds to operation S41 without updating the policy parameter of the agent $i_h$ and the policy parameters of the subsequent agents.

On the other hand, when determining that the update width of the policy parameter of the agent $i_h$ exists in the range determined depending on the influence degree A and the influence degree B (operation S26; Yes), the information processing apparatus 1 performs the following processing. For example, the information processing apparatus 1 updates the policy parameter of the agent $i_h$ within the range determined depending on the influence degree A and the influence degree B (operation S27).

The information processing apparatus 1 determines whether or not the agent update index h is smaller than the number n of the agents (operation S28). When determining that h is equal to or larger than n (operation S28; No), the information processing apparatus 1 proceeds to operation S41 since the processing for all the agents is completed.

When determining that h is smaller than n (operation S28; Yes), the information processing apparatus 1 causes the influence degree B to be shared with the next agent $i_{h+1}$ in the update order (operation S29). The information processing apparatus 1 increments the agent update index h by 1 (operation S30). The information processing apparatus 1 proceeds to operation S24 to execute the update processing on the next agent $i_h$ in the update order.

As illustrated in FIG. 3C, in operation S41, the information processing apparatus 1 updates the learning parameters other than the policy parameter (operation S41). The information processing apparatus 1 increments the learning episode count by 1 (operation S42).

The information processing apparatus 1 determines whether or not the learning episode count e is larger than a maximum episode count (operation S43). When determining that the learning episode count e is not larger than the maximum episode count (operation S43; No), the information processing apparatus 1 proceeds to operation S13 to process the next learning episode.

On the other hand, when determining that the learning episode count e is larger than the maximum episode count (operation S43; Yes), the information processing apparatus 1 ends the multi-agent reinforcement learning processing.

In the above description of FIGS. 3A to 3C, when the episode e is renewed, the information processing apparatus 1 executes control for a certain time period, saves a combination history of states, an action, and a reward for each agent during that time period in the combination history information 21, and uses this combination history information 21 to update the policy of each agent in the new episode e. However, the information processing apparatus 1 is not limited to this. Instead, when the episode e is renewed, the information processing apparatus 1 may update the policy of each agent in the new episode e by using the combination history already stored in the combination history information 21.

[Examples of Application Result of Multi-Agent Reinforcement Learning]

Figure 4A:
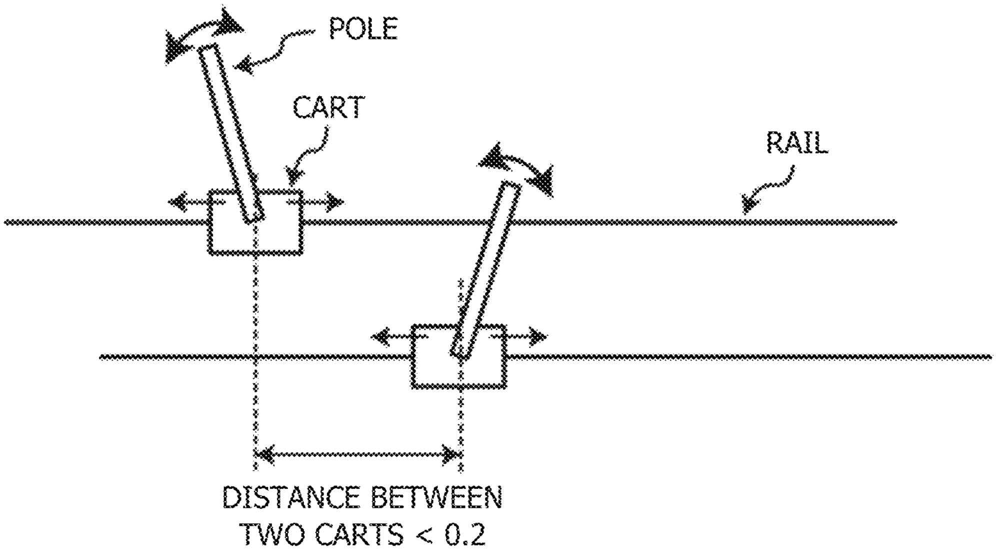
FIG. 4A is a diagram (1) illustrating an example of an application result of the multi-agent reinforcement learning according to the embodiment.
Figure 4B:
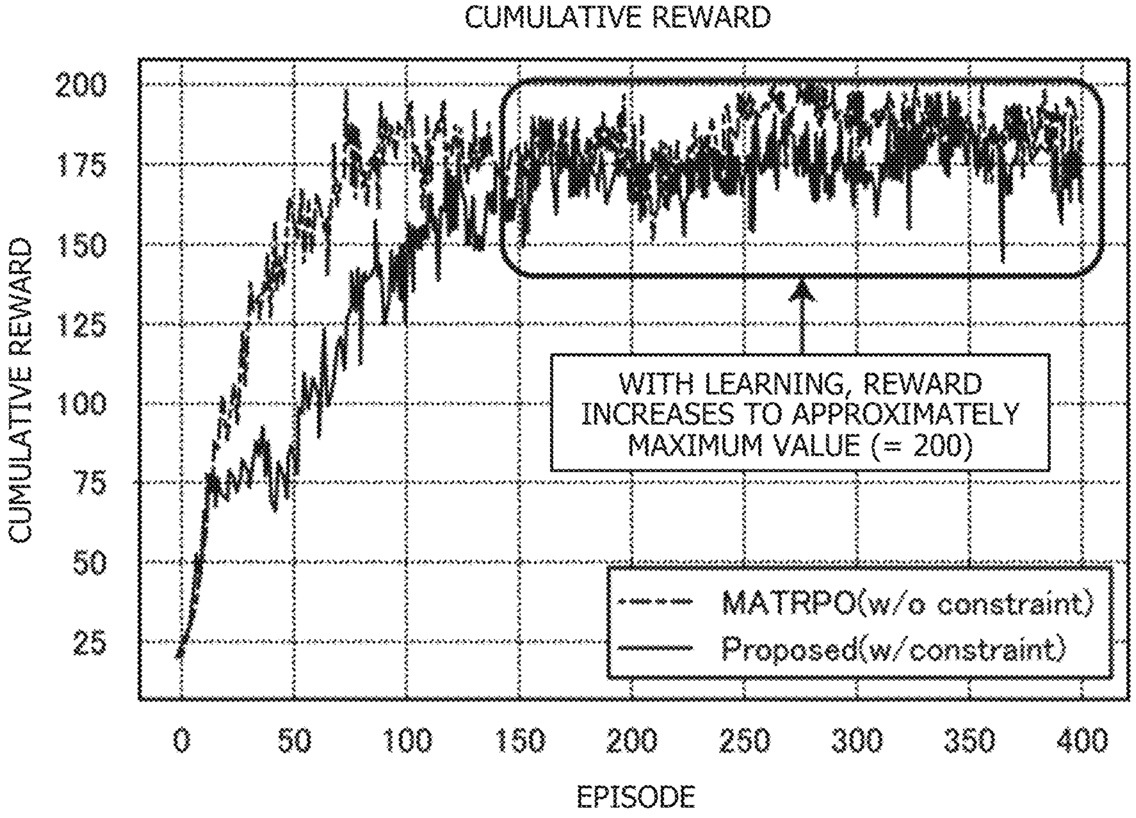
FIG. 4B is a diagram (2) presenting the example of the application result of the multi-agent reinforcement learning according to the embodiment.
Figure 4C:
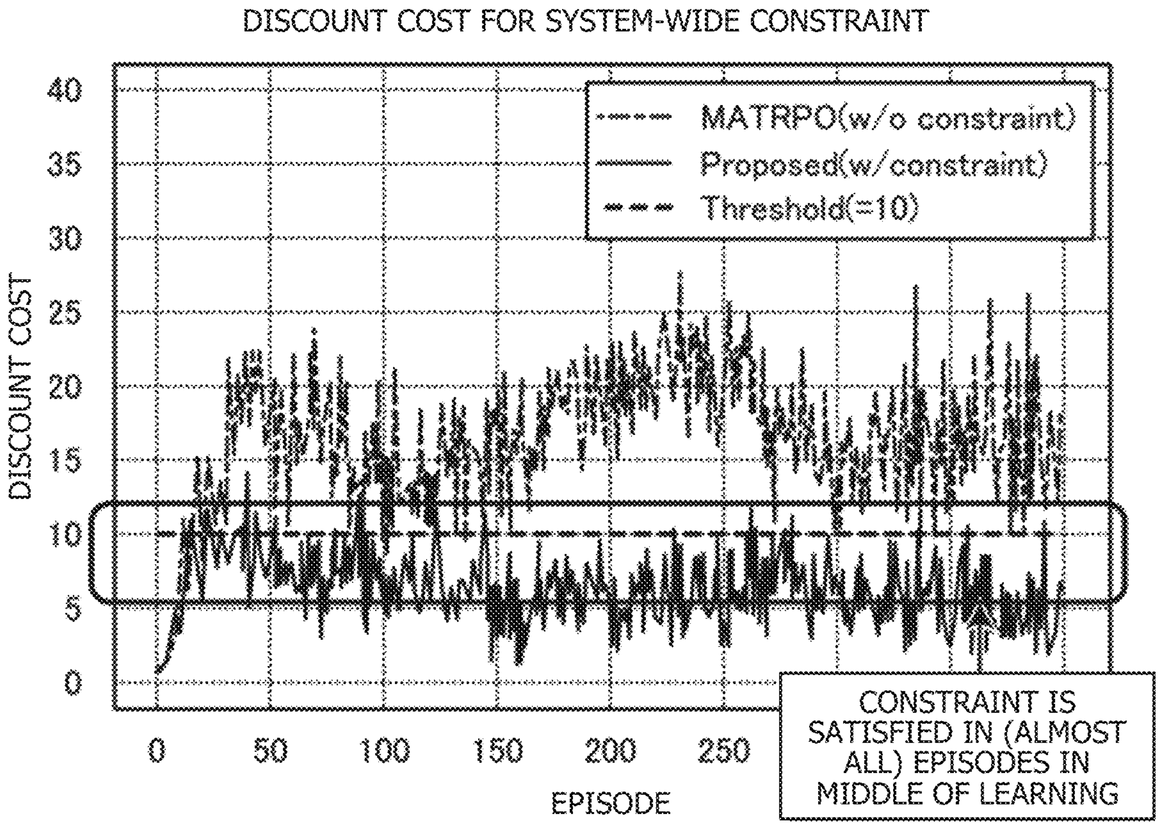
FIG. 4C is a diagram (3) presenting the example of the application result of the multi-agent reinforcement learning according to the embodiment.

An application result of the multi-agent reinforcement learning according to the embodiment will be described with reference to FIGS. 4A to 4C. FIGS. 4A to 4C are diagrams that illustrate an example of an application result of the multi-agent reinforcement learning according to the embodiment. FIGS. 4A to 4C illustrate experimental results of learning an algorithm for controlling two cart poles (moving on two parallel rails).

As illustrated in FIG. 4A, two cart poles are mounted on two parallel rails, respectively. Each cart pole is an example of the "agent". To keep a cumulative discounted cost (hereafter, referred to as "discount cost") in each episode equal to 10 or less under the condition that a cost in a case where the distance between the two carts is larger than 0.2 is set to "1" and a cost in other cases is set to "0" is an example of the system-wide "constraints". Positions and speeds of the two carts and angles and angular velocities of the poles thereof are examples of the "states". To move each of the carts to the right or left (give an input of 0 or 1 to each cart) is an example of the "action". A time period during which both of the poles of the two carts do not fall from an initial state is an example of the "reward (objective function)". The maximum of that time period is 200 seconds, and the initial state is randomly set within a certain range. For simplification of the problem, the experiment was made by only considering the system-wide constraint (without considering the agent-specific constraints).

Under such experimental conditions, multi-agent reinforcement learning was tried.

FIG. 4B illustrates a graph indicating an accumulated reward (cumulative reward) for each episode in each of learning in consideration of the system-wide constraint and learning without consideration of the system-wide constraint. An X axis of the graph indicates the episode count. A Y axis of the graph indicates the cumulative reward. A line graph depicted with a solid line is a result of the cumulative reward in each episode in the learning in consideration of the system-wide constraint (Proposed). A line graph depicted with a dashed-dotted line is a result of the cumulative reward in each episode in the learning without consideration of the system-wide constraint (MATPRO). Each line graph indicates an average value of five trials.

As illustrated in FIG. 4B, it is understood that the cumulative reward increases to around the maximum value (200 seconds) by learning in both cases of the learning in consideration of the system-wide constraint and the learning without consideration of the system-wide constraint.

FIG. 4C illustrates a graph indicating a discount cost for the system-wide constraint in each episode in each of the learning in consideration of the system-wide constraint and the learning without consideration of the system-wide constraint. An X axis of the graph indicates the episode count. A Y axis of the graph indicates the discount cost. A broken line is a threshold value and indicates "10" as a discount cost for the system-wide constraint. A reason why the threshold value is "10" is that the system-wide constraint is to keep the discount cost in each episode equal to or lower than 10. A line graph depicted with a solid line is a result of the discount cost for the system-wide constraint in each episode in the learning in consideration of the system-wide constraint (Proposed). A line graph depicted with a dashed-dotted line is a result of the discount cost for the system-wide constraint in each episode in the learning without consideration of the system-wide constraint (MATPRO). Each line graph indicates an average value of five trials.

As illustrated in FIG. 4C, a result is presented in which almost all the discount costs for the system-wide constraint do not exceed the threshold "10" in the case of the learning in consideration of the system-wide constraint. For example, it is understood that, in the case of the learning in consideration of the system-wide constraint, the system-wide constraint is satisfied in almost all the episodes even in the middle of the learning. On the other hand, a result is presented in which almost all the discount costs exceed the threshold "10" in the case of the learning without consideration of the system-wide constraint.

Accordingly, the multi-agent reinforcement learning according to the embodiment is able to achieve learning of updating the policies for increasing the reward while satisfying the system-wide constraint both during the learning and after the learning. For example, according to the multi-agent reinforcement learning according to the embodiment, it is possible to perform learning in consideration of the system-wide constraint that depends on results of actions of multiple agents.

With reference to FIGS. 4A to 4C, the case of learning the algorithm for controlling the two cart poles is described as an application example of the multi-agent reinforcement learning. However, the multi-agent reinforcement learning is not limited to this.

For example, the multi-agent reinforcement learning may be applied to a case of learning an algorithm for wave transmission stop control of base stations (BSs) in a communication network. In such a case, learning of an algorithm for wave transmission stop control of each BS is performed so as to minimize the total sum of power to be consumed by all the BSs while keeping a certain or higher average satisfaction level of all users attached to the BS in each area.

Each BS is an example of the "agent". Keeping a certain or higher average satisfaction level of all users is an example of the system-wide "constraints". A time point, an amount of grid demand, a load of a BS at a previous time point, power consumed by the BS at the previous time point, and so on are examples of the "states". Stopping or continuing wave transmission of each BS (turning the BS on/off) is an example of the "actions". The total sum of power to be consumed by all the BSs is an example of the "reward (objective function)".

Thus, the multi-agent reinforcement learning is able to achieve the learning for updating the policies for minimizing the reward, while satisfying the system-wide constraint during and after the learning. Additionally, this also enables cooperative BS wave transmission stop control in a wide range extending over multiple areas, and further improves power saving performance. The multi-agent reinforcement learning is able to guarantee the users' satisfaction level in the entire area without tuning the weighting coefficient and the penalty term of the objective function, and to reduce the number of man-hours consumed for trial and error of the learning.

In another example, the multi-agent reinforcement learning may be applied to a case of learning an algorithm for air conditioning control in a data center. In such a case, learning of an algorithm for controlling each of multiple air conditioners installed in a data center is performed so as to minimize the total sum of power to be consumed by all the air conditioners while keeping the temperature of a server in the data center at a certain value or lower. Keeping the temperature of the server in the data center at a certain value or lower is an example of the system-wide "constraints". A time point, a temperature of a server, power consumed by the server at a previous time point, a set temperature of an air conditioner at the previous time point, and the like are examples of the "states". A set temperature (or a command to increase or decrease the set temperature) of each air conditioner, the intensity of air-conditioning, and the like are examples of the "action". A total sum of power to be consumed by all the air conditioners is an example of the "reward (objective function)".

Thus, the multi-agent reinforcement learning is able to achieve the learning for updating the policies for minimizing the reward, while satisfying the system-wide constraint during and after the learning. In addition, this also enables cooperative air-conditioning control of the multiple air conditioners, and further improves power saving performance. The multi-agent reinforcement learning makes it possible to guarantee that the temperature of the server in the data center is kept at a certain value or lower without tuning the weighting coefficient and the penalty term of the objective function, and to reduce the number of man-hours consumed for trial and error of the learning.

In another example, the multi-agent reinforcement learning may be applied to a case of learning an algorithm for a problem of transporting commodities using multiple drones. In such a case, learning of an algorithm for controlling each of drones is performed so as to minimize a time period for transporting the commodities (transport objects) while keeping a certain or longer distance between the drones. Keeping a certain or longer distance between the drones is an example of the system-wide "constraints". A position, a speed, and the like of each drone are examples of the "states". A rotational speed of each propeller (or a torque input to each propeller) of each drone is an example of the "action". A time period for transporting the commodities (transport objects) is an example of the "reward (objective function)".

Thus, the multi-agent reinforcement learning is able to achieve the learning for updating the policies for minimizing the reward, while satisfying the system-wide constraint during and after the learning. In addition, this enables the multiple drones to cooperatively fly and transport and further shortens the transport time period. The multi-agent reinforcement learning is able to guarantee the certain or longer distance between the drones without tuning the weighting coefficient and the penalty term of the objective function, and to reduce the number of man-hours consumed for trial and error of the learning.

Effect of Embodiments

According to the above-described embodiments, in a constrained control problem in which multiple agents are involved, the information processing apparatus 1 calculates, according to a predetermined policy parameter update order of the agents, the degree of influence on the constraints specific to the own agent and the degree of influence on the system-wide constraints in which the degree of influence by the post-update policy parameter of the preceding agent in the update order is shared. When an update width of the policy parameter of the own agent exists in both ranges respectively determined depending on the degree of influence on the constraints specific to the own agent and the degree of influence on the system-wide constraints, the information processing apparatus 1 updates the policy parameter of the own agent and causes the degree of influence after the update to be shared with the next agent in the update order. With this configuration, the information processing apparatus 1 is able to perform learning in consideration of the system-wide constraints that depend on results of actions of the multiple agents.

According to the above-described embodiments, when the update width of the policy parameter of the own agent does not exist in any one of the ranges respectively determined depending on the degree of influence on the constraints specific to the own agent and the degree of influence on the system-wide constraints, the information processing apparatus 1 aborts update of the policy parameter of the own agent and the policy parameters of the subsequent agents in the update order. With this configuration, the information processing apparatus 1 is able to guarantee that the constraints specific to each agent and also the system-wide constraints that depend on results of actions of the multiple agents will be satisfied during and after the learning.

According to the above-described embodiments, the information processing apparatus 1 randomly determines the policy parameter update order of all the agents in order for each of the agents to update its policy parameter for the purpose of maximizing or minimizing the reward common to the agents. According to the determined update order, the information processing apparatus 1 calculates the degree of influence on the constraints specific to the own agent and the degree of influence on the system-wide constraints. With this configuration, the information processing apparatus 1 is able to equally update the policy parameters of all the agents by randomly determining the policy parameter update order of all the agents.

The illustrated constituent elements of the information processing apparatus 1 do not necessarily have to be configured physically exactly as in the drawing. For example, the specific form of distribution and integration of the information processing apparatus 1 is not limited to that illustrated in the drawing, and all or part thereof may be configured to be functionally or physically distributed or integrated in arbitrary units depending on various loads, usage states, and so on. The storage unit 20 may be coupled as an external device to the information processing apparatus 1 via a network.

Figure 5:
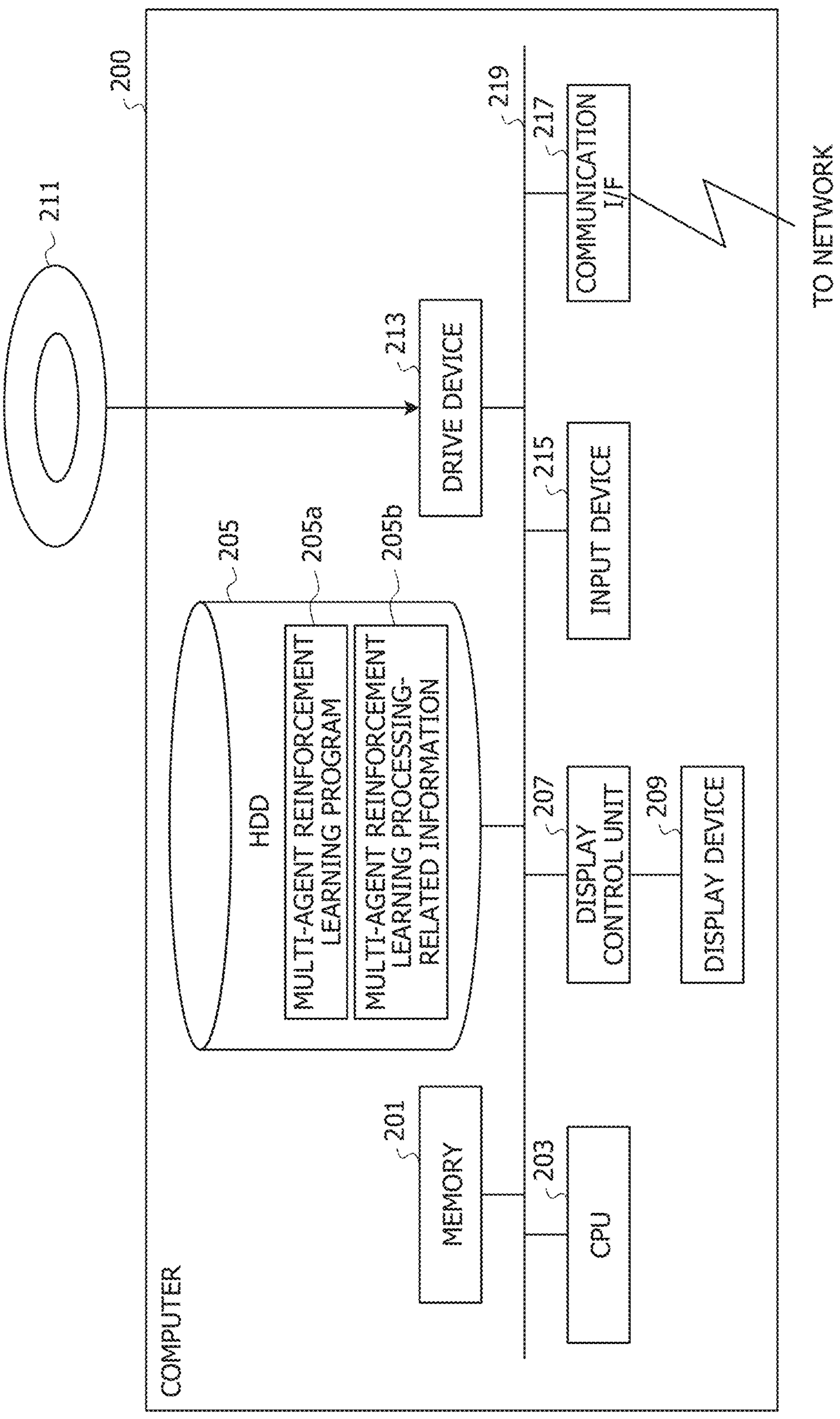
FIG. 5 is a diagram illustrating an example of a computer that executes a multi-agent reinforcement learning program.

The various kinds of processing described in the above embodiments may be implemented by a computer such as a personal computer or a workstation executing a program prepared in advance. Hereinafter, an example of a computer that executes a multi-agent reinforcement learning program for implementing the same functions as those of the information processing apparatus 1 illustrated in FIG. 1 will be described. A multi-agent reinforcement learning program for implementing the same functions as those of the information processing apparatus 1 will be described as an example. FIG. 5 is a diagram illustrating an example of a computer that executes the multi-agent reinforcement learning program.

As illustrated in FIG. 5, a computer 200 includes a central processing unit (CPU) 203 that executes various kinds of arithmetic processing, an input device 215 that receives inputs of data from a user, and a display device 209. The computer 200 also includes a drive device 213 that reads programs and so on from storage media, and a communication interface (I/F) 217 that exchanges data with another computer via a network. The computer 200 also includes a memory 201 that temporarily stores various kinds of information and a hard disk drive (HDD) 205. The memory 201, the CPU 203, the HDD 205, a display control unit 207, the display device 209, the drive device 213, the input device 215, and the communication I/F 217 are coupled to each other by a bus 219.

The drive device 213 is, for example, a device for a removable disk 211. The HDD 205 stores a multi-agent reinforcement learning program 205*a* and multi-agent reinforcement learning processing-related information 205*b*. The communication I/F 217 serves as an interface between the network and the inside of the computer, and controls inputs and outputs of data from and to another computer. For example, a modem, a local area network (LAN) adapter, or the like may be employed as the communication I/F 217.

The display device 209 is a display device that displays a cursor, icons, tool boxes, and data such as documents, images, and functional information. For example, a liquid crystal display, an organic electroluminescence (EL) display, or the like may be employed as the display device 209.

The CPU 203 reads the multi-agent reinforcement learning program 205*a*, develops the program in the memory 201, and executes the program as processes. These processes correspond to the respective functional units of the information processing apparatus 1. The multi-agent reinforcement learning processing related-information 205*b* contains, for example, the combination history information 21. For example, the removable disk 211 stores various kinds of information such as the multi-agent reinforcement learning program 205*a*.

The multi-agent reinforcement learning program 205*a* does not necessarily have to be stored in the HDD 205 from the beginning. For example, the program may be stored in a "portable physical medium" to be inserted into the computer 200, such as a flexible disk (FD), a compact disk read-only memory (CD-ROM), a Digital Versatile Disc (DVD), a magneto-optical disk, or an integrated circuit (IC) card. The computer 200 may read the multi-agent reinforcement learning program 205*a* from this medium and execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a multi-agent reinforcement learning program for causing a computer to execute a process for a constrained control problem in which a plurality of agents are involved, the process comprising:

obtaining, according to a predetermined update order of a policy parameter of each agent of the plurality of agents, a degree of influence on a constraint specific to a first agent of the plurality of agents and a degree of influence on a system-wide constraint in which a degree of influence by an updated policy parameter of a second agent previous to the first agent in the update order is shared, the second agent being included in the plurality of agents;

in a case where an update width of the policy parameter of the first agent exists in both ranges respectively determined depending on the degree of influence on the constraint specific to the first agent and the degree of influence on the system-wide constraint, updating the policy parameter of the first agent and causing the degree of influence on the system-wide constraints by the updated policy parameter to be shared with a third agent next to the first agent in the update order, the third agent being included in the plurality of agents;

in a case where the update width of the policy parameter of the first agent does not exist in any of the ranges respectively determined depending on the degree of influence on the constraint specific to the first agent and the degree of influence on the system-wide constraint, aborting update of the policy parameter of the first agent and the policy parameter of the third agent; and randomly determining the update order of the policy parameter of each agent of the plurality of agents to update policy parameter for the purpose of one of maximizing and minimizing a reward common to the agents, and wherein the process is configured to obtain the degree of influence on the constraint specific to the first agent and the degree of influence on the system-wide constraint according to the determined update order.

2. An information processing apparatus comprising:

a memory; and a processor coupled to the memory and configured to:

obtain, according to a predetermined update order of a policy parameter of each agent of a plurality of agents, a degree of influence on a constraint specific to a first agent of the plurality of agents and a degree of influence on a system-wide constraint in which a degree of influence by an updated policy parameter of a second agent previous to the first agent in the update order is shared, the second agent being included in the plurality of agents, in a case where an update width of the policy parameter of the first agent exists in both ranges respectively determined depending on the degree of influence on the constraint specific to the first agent and the degree of influence on the system-wide constraint, update the policy parameter of the first agent and cause the degree of influence on the system-wide constraints by the updated policy parameter to be shared with a third agent next to the first agent in the update order, the third agent being included in the plurality of agents;

in a case where the update width of the policy parameter of the first agent does not exist in any of the ranges respectively determined depending on the degree of influence on the constraint specific to the first agent and the degree of influence on the system-wide constraint, abort update of the policy parameter of the first agent and the policy parameter of the third agent; and randomly determine the update order of the policy parameter of each agent of the plurality of agents to update policy parameter for the purpose of one of maximizing and minimizing a reward common to the agents, and wherein the processor is configured to obtain the degree of influence on the constraint specific to the first agent and the degree of influence on the system-wide constraint according to the determined update order.

3. A multi-agent reinforcement learning method for causing a computer to execute a process for a constrained control problem in which a plurality of agents are involved, the process comprising:

obtaining, according to a predetermined update order of a policy parameter of each agent of the plurality of agents, a degree of influence on a constraint specific to a first agent of the plurality of agents and a degree of influence on a system-wide constraint in which a degree of influence by an updated policy parameter of a second agent previous to the first agent in the update order is shared, the second agent being included in the plurality of agents;

in a case where an update width of the policy parameter of the first agent exists in both ranges respectively determined depending on the degree of influence on the constraint specific to the first agent and the degree of influence on the system-wide constraint, updating the policy parameter of the first agent and causing the degree of influence on the system-wide constraints by the updated policy parameter to be shared with a third agent next to the first agent in the update order, the third agent being included in the plurality of agents;

in a case where the update width of the policy parameter of the first agent does not exist in any of the ranges respectively determined depending on the degree of influence on the constraint specific to the first agent and the degree of influence on the system-wide constraint, aborting update of the policy parameter of the first agent and the policy parameter of the third agent; and randomly determining the update order of the policy parameter of each agent of the plurality of agents to update policy parameter for the purpose of one of maximizing and minimizing a reward common to the agents, and wherein the process is configured to obtain the degree of influence on the constraint specific to the first agent and the degree of influence on the system-wide constraint according to the determined update order.

* * * * *